United States Patent
Sheehan et al.

(10) Patent No.: US 6,736,540 B1
(45) Date of Patent: May 18, 2004

(54) METHOD FOR SYNCHRONIZED DELTA-VBE MEASUREMENT FOR CALCULATING DIE TEMPERATURE

(75) Inventors: Gary E. Sheehan, Londonderry, NH (US); Jun Wan, Haverhill, MA (US)

(73) Assignee: National Semiconductor Corporation, Santa Clara, CA (US)

(*) Notice: Subject to any disclaimer, the term of this patent is extended or adjusted under 35 U.S.C. 154(b) by 0 days.

(21) Appl. No.: 10/375,297

(22) Filed: Feb. 26, 2003

(51) Int. Cl.[7] ............... G01K 7/01; G01K 7/16; H01L 35/00
(52) U.S. Cl. ............... 374/183; 374/178; 374/163; 327/572
(58) Field of Search ................ 374/183, 178, 374/163; 327/572

(56) References Cited

U.S. PATENT DOCUMENTS

| | | | | |
|---|---|---|---|---|
| 3,760,200 A | * | 9/1973 | Taniguchi et al. | 326/30 |
| 3,872,726 A | * | 3/1975 | Kauffeld et al. | 374/169 |
| 3,887,781 A | * | 6/1975 | Peters, Jr. | 219/627 |
| 4,243,898 A | | 1/1981 | Seelbach | 307/310 |
| 4,277,975 A | * | 7/1981 | Pinkham | 374/170 |
| 4,480,312 A | * | 10/1984 | Wingate | 702/130 |
| 4,625,128 A | | 11/1986 | Boeckmann | 307/310 |
| 4,642,785 A | * | 2/1987 | Packard et al. | 702/131 |
| 5,257,210 A | * | 10/1993 | Schneider et al. | 702/109 |
| 5,469,071 A | * | 11/1995 | Obata | 324/713 |
| 5,660,474 A | | 8/1997 | Kurihara | 374/178 |
| 5,829,879 A | | 11/1998 | Sanchez et al. | 374/178 |
| 5,982,221 A | * | 11/1999 | Tuthill | 327/512 |
| 6,060,874 A | * | 5/2000 | Doorenbos | 323/316 |
| 6,078,208 A | * | 6/2000 | Nolan et al. | 327/512 |
| 6,149,299 A | * | 11/2000 | Aslan et al. | 374/178 |
| 6,208,172 B1 | * | 3/2001 | Evoy et al. | 327/12 |
| 6,363,490 B1 | | 3/2002 | Senyk | 713/300 |
| 6,501,282 B1 | * | 12/2002 | Dummermuth et al. | 324/679 |
| 6,554,469 B1 | * | 4/2003 | Thomson et al. | 374/178 |
| 6,629,776 B2 | * | 10/2003 | Bell et al. | 374/170 |
| 6,657,476 B1 | * | 12/2003 | Bicking | 327/341 |
| 2002/0063575 A1 | * | 5/2002 | Kim et al. | 326/30 |

* cited by examiner

*Primary Examiner*—Gail Verbitsky
(74) *Attorney, Agent, or Firm*—Patent Law Group LLP; Carmen C. Cook

(57) ABSTRACT

A method for measuring a temperature of an integrated circuit is disclosed. The integrated circuit includes a temperature sensing element being excited by a first switched current and a second switched current. The method includes coupling a first capacitor to the temperature sensing element through a first switch and coupling a second capacitor to the temperature sensing element through a second switch. The first and second capacitors are external to the integrated circuit. The method further includes charging the first capacitor through the first switch to a first voltage when the temperature sensing element is being excited by the first switched current, charging the second capacitor through the second switch to a second voltage when the temperature sensing element is being excited by the second switched current, and measuring a difference between the first voltage and the second voltage to determine the temperature of the integrated circuit.

26 Claims, 4 Drawing Sheets

METHOD FOR SYNCHRONIZED DELTA-VBE MEASUREMENT FOR CALCULATING DIE TEMPERATURE

FIELD OF THE INVENTION

The invention relates to a method for chip temperature measurement and, in particular, to a method for synchronously measuring a delta-VBE ($\Delta V_{BE}$) voltage of an on-chip diode to calculate the chip temperature.

DETAILED DESCRIPTION OF THE PREFERRED EMBODIMENTS

In accordance with the principles of the present invention, a method for measuring the temperature of an integrated circuit incorporating a temperature sensing element is described. The method includes coupling a first capacitor to the temperature sensing element to measure a first voltage while the temperature sensing element is being excited by a first switched current and coupling a second capacitor to the temperature sensing element to measure a second voltage while the temperature sensing element is being excited by a second switched current. The first voltage and the second voltage can be used to compute the delta-VBE ($\Delta V_{BE}$) voltage of the temperature sensing element which $\Delta V_{BE}$ is indicative of the substrate temperature of the integrated circuit when the integrated circuit is operated according to the method of the present invention. The first capacitor and the second capacitor are external to the integrated circuit and are coupled to the temperature sensing element through external leads on the integrated circuit.

According to one aspect of the present invention, the temperature measurement method is applied to calibrate a temperature sensor integrated circuit. In particular, the temperature measurement method can be performed synchronously with the operation of the temperature sensor so that a measurement of the same temperature sensed by the temperature sensor can be obtained. In this manner, a very precise and accurate calibration can be achieved.

In a temperature sensor, a temperature sensing element generates a voltage proportional to absolute temperature (i.e. temperature measured in degrees Kelvin) which voltage is coupled to device circuitry of the temperature sensor. The device circuitry process the voltage output from the temperature sensing element to provide a temperature output signal. The accuracy of the temperature measurement by the temperature sensor is limited by offset voltages and noise that may be present in the device circuitry, such as when the device circuitry includes amplifiers. Amplifier offset voltages and 1/f noise introduce errors in the temperature measurements. Usually, the temperature sensor integrated circuit is calibrated near the end of the manufacturing process to minimize these inherent offset errors. Calibration typically involves measuring or estimating the temperature error and then trimming the appropriate circuit to correct for the error. Therefore, an accurate measurement of the actual temperature sensed by the temperature sensing element is desired so that the sensed temperature can be compared with the temperature sensor output temperature. Then, precise calibration can be performed to provide a temperature sensor with high accuracy. The application of the method of the present invention for obtaining an accurate measurement of the sensed die temperature of a temperature sensor for use in calibration will be described in more detail below.

Figure 1:
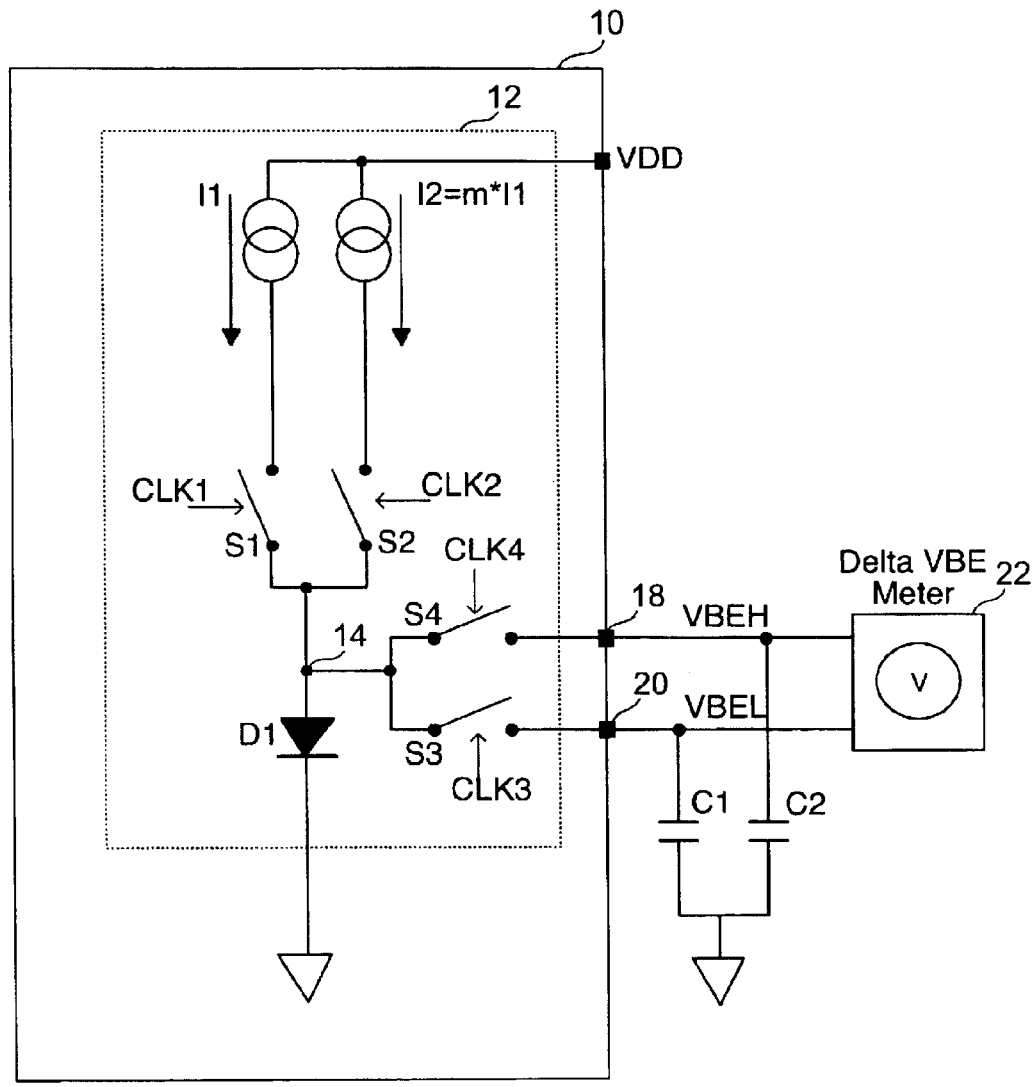
FIG. 1 is a circuit diagram of a temperature measurement circuit which can be used to practice the method of the present invention.

The application of the temperature measurement method of the present invention to a general purpose integrated circuit will first be described. FIG. 1 is a circuit diagram of a temperature measurement circuit which can be used to practice the method of the present invention. The temperature measurement method of the present invention can be applied in general to any integrated circuit for measuring the substrate temperature of the integrated circuit. The measured temperature can be used in a variety of applications, such as to control the power on/off status or the cooling apparatus associated with the integrated circuit.

Referring to FIG. 1, the integrated circuit of which the substrate temperature is of interest is denoted as integrated circuit 10. Integrated circuit 10 can be any general purpose or custom designed integrated circuits. The circuitry for performing the intended function of integrated circuit 10 is not shown in FIG. 1. The temperature measurement method of the present invention can be applied to integrated circuit 10 as long as integrated circuit 10 includes a temperature sensing circuit. In the present embodiment, the temperature measurement method is coordinated to operate with a switched current temperature sensing circuit. Thus, to facilitate temperature measurement, integrated circuit 10 includes on its substrate a switched current temperature sensing circuit 12. Furthermore, external pin connections (external leads) are provided to couple relevant voltage values from temperature sensing circuit 12 to an off-chip circuit for conducting the temperature measurement.

Temperature sensing circuit 12 includes a single diode D1 as the temperature sensing element utilizing a parasitic vertical PNP bipolar transistor (VPNP) common to virtually all standard CMOS processes. In other embodiments, diode D1 can be formed as a p-n junction diode or a diode-connected bipolar transistor. Diode D1 is excited by two fixed ratio current sources I1 and I2. In the present illustration, current source I2 has a current value m times the current value of current source I1, where m can represent any fixed ratio of known and predictable value and does not have to be an integer. In practice, the current sources are designed with a known fixed ratio value. Any variation of the known fixed ratio value due to the fabrication process is predictable as the variation can be characterized. Current sources I1 and I2 are switchably connected to diode D1 through switches S1 and S2. Switches S1 and S2 are controlled by clock signals CLK1 and CLK2, respectively. Clock signals CLK1 and CLK2 employ a non-overlapping clocking scheme such that only one of switches S1 and S2 is closed at a time. By the application of the switched currents I1 and I2, a voltage V-diode develops at diode D1 (node 14) where the change in the voltage V-diode can be used to derive the substrate temperature sensed by diode D1.

Specifically, when current I1 is applied, a $V_{BE}$ voltage at the low current level (VBEL) is developed at node 14 and when current I2 is applied, a $V_{BE}$ voltage at the high current level (VBEH) is developed at node 14. The difference between the VBEL and VBEH voltages is the $\Delta V_{BE}$ voltage for computing the sensed temperature as will be described in more detail below.

In the present embodiment, the temperature measurement method operates to measure the diode voltage V-diode using an off-chip measurement circuit. The off-chip measurement method has advantages in that only minimal circuitry is required to be incorporated in integrated circuit 10 to practice the method of the present invention. Thus, the chip size and cost of integrated circuit 10 is not significantly increased in order to incorporate the necessary circuitry for practicing the method of the present invention. Referring to FIG. 1, the VBE voltages at the two current levels are read out of integrated circuit 10 through switches S3 and S4 on external leads 18 and 20. Specifically, switch S3, controlled by a clock signal CLK3, couples voltage V-diode on node 14 to external lead 20 while switch S4, controlled by a clock signal CLK4, couples voltage V-diode on node 14 to external lead 18. In the present embodiment, clock CLK3 is asserted synchronously with clock CLK1 such that the diode voltage VBEL is provided on lead 20. On the other hand, clock CLK4 is asserted in synchronous with clock CLK2 such that the diode voltage VBEH is provided on lead 18.

In the present illustration, leads 18 and 20 are dedicated pins for coupling the VBE voltages to the external measurement circuit. The use of dedicated external leads for practicing the method of the present invention is illustrative only. In actual implementation, leads 18 and 20 can be multifunction pins whereby the leads are connected to switches S4 and S3, respectively, only when the temperature measurement method of the present invention is initiated. In normal operations, leads 18 and 20 can be used by integrated circuit 10 for other functions.

External to integrated circuit 10, a first capacitor C1 is coupled between lead 20 and the ground potential and a second capacitor C2 is coupled between lead 18 and the ground potential. Capacitors C1 and C2 function as holding capacitors for sampling and holding the respective VBE voltages from temperature sensing circuit 12. Capacitor C1 samples and holds diode voltage VBEL while capacitor C2 samples and holds diode voltage VBEH. Capacitors C1 and C2 are also coupled to a voltmeter 22 which voltmeter measures the voltage difference between diode voltages VBEL and VBEH stored on capacitors C1 and C2 which voltage difference is the temperature-proportional delta-VBE ($\Delta V_{BE}$) voltage. In the present illustration, voltmeter 22 provides a voltage reading indicative of the $\Delta V_{BE}$ voltage which can be used to compute the sensed temperature of diode D1 as follows.

The relationship between the $\Delta V_{BE}$ voltage of a temperature sensing diode and the applied fixed ratio currents from current sources I1 and I2 is given as follows:

$$\Delta VBE = \frac{(nf \times k \times T)}{q} \times \ln\left(\frac{I2}{I1}\right),$$

where I1 represents the current value at current source I1, I2 represents the current value at current source I2, T is temperature in degree Kelvin, q is the electronic charge and has a value of $1.602 \times 10^{-19}$C, and k is the Boltzmann's constant and has a value of $1.381 \times 10^{-23}$J/K. nf is the emission coefficient factor where nf is usually close to 1 but not negligibly close to 1. For example, the factor nf can be 1.005. Because current I2 is m*I1, the ratio (I2/I1) of the two currents is merely m. When the $\Delta V_{BE}$ voltage is known, the temperature sensed by the diode can be computed as follows:

$$T = \frac{\Delta VBE \times q}{nf \times k \times \ln(m)}.$$

Thus, by applying fixed ratio currents to diode D1 and measuring the VBE voltages associated with each current level, the $\Delta V_{BE}$ value can be obtained and the temperature sensed by the diode can be computed.

Figure 2:
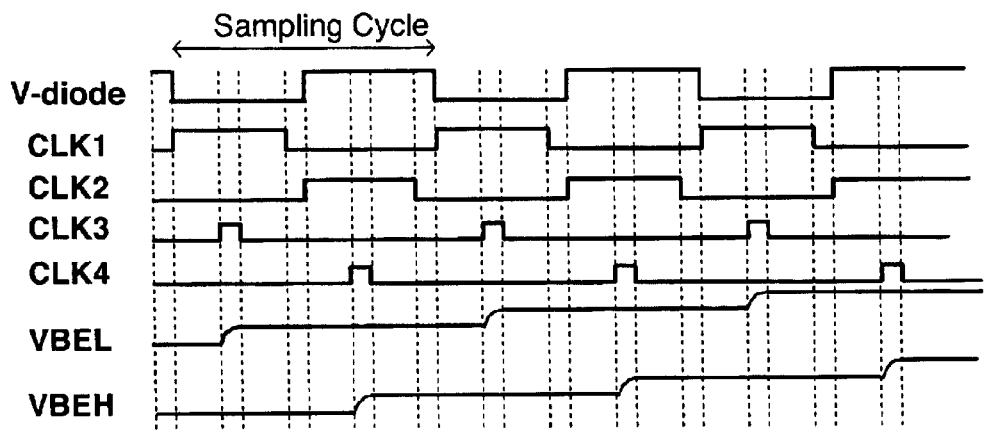
FIG. 2 is a timing diagram illustrating the clocks and the resulting voltages during the operation of the temperature measurement method of the present invention.

The operation of the temperature measurement method of the present invention will now be described with reference to the timing diagram in FIG. 2. By applying non-overlapping clock signals CLK1 and CLK2, currents I1 and I2 are alternately applied to diode D1. The switched current excitation of diode D1 causes the diode voltage V-diode at node 14 to switch between a first voltage level (settled VBEL) and a second, higher voltage level (settled VBEH). The two voltages are synchronously sampled through switches S3 and S4 to holding capacitors C1 and C2. Specifically, under the control of clock CLK3 which is asserted during the active period of clock CLK1, switch S3 is closed and voltage VBEL is sampled onto capacitor C1. Alternately, under the control of clock CLK4 which is asserted during the active period of clock CLK2, switch S4 is closed and voltage VBEH is sampled onto capacitor C2.

In the present illustration, clocks CLK3 and CLK4 are only active for a short fraction of the sampling cycle period. With each successive application of excitation currents and sampling of the VBE voltages, capacitors C1 and C2 are gradually charged to the final VBEL and VBEH voltages values. As shown in FIG. 2, at each sampling cycle of the diode voltages, voltages VBEL and VBEH at capacitors C1 and C2 gradually increase in a step-wise fashion towards the final voltage values.

Figure 3:
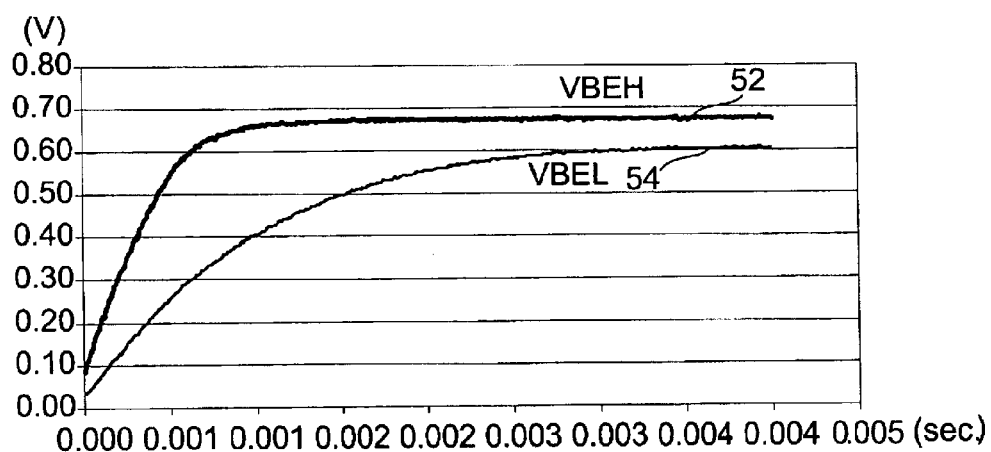
FIG. 3 is a graph of the voltage versus time curves showing the charging of the VBEL voltage at capacitor C1 and the charging of the VBEH voltage at capacitor C2.

FIG. 3 is a graph of the voltage versus time curves showing the charging of the VBEL voltage at capacitor C1 and the charging of the VBEH voltage at capacitor C2. Referring to FIG. 3, the VBEH voltage is illustrated by curve 52 while the VBEL voltage is illustrated by curve 54. In the present embodiment, capacitor C1 and capacitor C2 have equal capacitance values. The VBEL voltage curve has a larger time constant than the VBEH voltage curve as capacitor C1 is being charged at a lower current level than capacitor C2. Specifically, the time constant of each VBE voltage curve is determined by the sum of the on-resistance of switches S3 and S4 and the dynamic resistance of diode D1 and the duty cycle of the charging voltage (that is, the duty cycle of clocks CLK3 and CLK4). Because a lower level of current flows through switch S3, the on-resistance of switch S3 is greater and thus the VBEL voltage curve has a greater time constant. Also, because diode D1 experiences different current levels when VBEL voltage and VBEH voltage are being generated, the dynamic resistance of diode D1 varies between the two current levels which also contributes to the difference in time constant for the VBE voltage curves.

After a few sampling cycles, capacitor C1 and capacitor C2 will be charged to their final VBE voltage values. The final VBEH and VBEL voltage values can then be measured by voltmeter 22 to determine the difference in VBE voltages or the $\Delta V_{BE}$ values.

In the present illustration, capacitors external to the integrated circuit of interest are used to store and filter the diode VBE voltages. The external capacitors can be discrete components built on a PC board. In some applications, the temperature measurement method of the present invention is practiced on an integrated circuit test equipment (a tester) whereby the capacitors can be formed on a test board and the voltmeter is a voltmeter of the tester. Capacitors C1 and C2 can have the same capacitance values or the capacitors can have different capacitance values. In one embodiment, each of capacitors C1 and C2 has a capacitance value of 1 nf. The exact capacitance values of capacitors C1 and C2 are not critical to the practice of the temperature measurement method of the present invention. The capacitance values affect the time constant to charge the capacitors, the filtering response of the capacitors and the ripple or AC component of the filtered response. Therefore, the capacitance values can be chosen to obtain the desired time constant for charging the capacitors or the desired filtering response. Alternately, the external capacitors can be formed on an integrated circuit separate from the integrated circuit of interest.

In another embodiment, capacitor C1 for capturing the lower VBEL voltage has a smaller capacitance value than capacitor C2 for capturing the higher VBEH voltage. Because capacitor C1 is being charged at a lower current level, a smaller capacitance value decreases the time constant for charging capacitor C1. As shown in FIG. 3, when capacitors C1 and C2 have equal capacitance values, the VBEL voltage charges at a slower rate because of a larger time constant associated with capacitor C1 being charged at a lower current level. By selecting a smaller capacitance for capacitor C1 than capacitor C2, the time constants for charging the VBEL and VBEH voltages can be made close to each other. Thus, the VBEL and VBEH voltages can be charged at the same rate so that better tracking of the VBEL and VBEH voltages can be achieved.

In the present illustration, temperature sensing circuit 12 is implemented as a switched current temperature sensing circuit using a single diode. While the temperature measurement method of the present invention can be practiced using other temperature sensing circuit, the use of the single-diode switched current temperature sensing circuit offers particular advantages.

First, by using a single temperature sensing diode with dual switched fixed ratio currents instead of two diodes with ratioed areas, measurement inaccuracy due to diode area mismatch, or transistor beta mismatch etc. can be avoided. The method of the present invention limits the variable error sources to only the mismatch in the fixed ratio current sources plus a negligibly small error due to variations in the extrinsic resistances of diode D1. However, the current mismatch error can be characterized for the manufacturing process used. Also, the variation in the extrinsic resistances of diode D1 is negligibly small as long as the current densities are not excessive. Specifically, the extrinsic resistances of diode D1 can be characterized as a parasitic resistor in series with diode D1 where the resistance ($R_p$) of the parasitic resistor is determined by the characteristics of the fabrication process, such as the size of diode D1 and process parameters including diffusion concentration and junction depth of diode D1. The parasitic resistor introduces a voltage error in the delta-VBE measurement in the amount of $R_p * \Delta I$ where $\Delta I$ is (I2−I1), the difference in current values between the two current sources. As long as the current densities for current sources I1 and I2 are kept small, the voltage error introduced by the parasitic resistor of diode D1 is negligible. Thus, the temperature sensing circuit can be built using a characterized process with minimal and known variation in current source ratio and negligible parasitic errors.

Second, the diode can be placed at or as near as possible to the location on integrated circuit 10 where temperature measurement is desired. Conventional temperature measurement methods typically use a temperature sensing element that is external to the device of interest and distant from the measurement point of interest. The physical separation introduces errors in the temperature measurement.

Lastly, by providing on-chip ratio matched current sources to excite the temperature sensing element, the use of off-chip current sources, such as those from an integrated circuit tester, is avoided. The use of external current sources is undesirable due to current mismatch from tester to tester thereby introducing another source of error in the temperature measurement. While a desired current ratio is designed into the temperature sensing circuit, the actual current ratio can be characterized upon completion of manufacturing for each fabrication process using the equations above. Thus, very accurate current ratio can be realized.

Furthermore, the use of capacitors C1 and C2 to sample and store the switched VBE voltages has the advantages of eliminating errors in the fully settled filtered response that may be introduced by the on-resistance of switches S3 and S4. Capacitors C1 and C2 hold the DC voltage values of the switching VBE voltages on node 14. Once the capacitors are charged to the final VBEH and VBEL voltages, the charging current through switches S3 and S4 reaches an equilibrium where only a small current due to charge injection at the switches will flow. Thus, the on-resistance of the switches becomes irrelevant.

Figure 4:
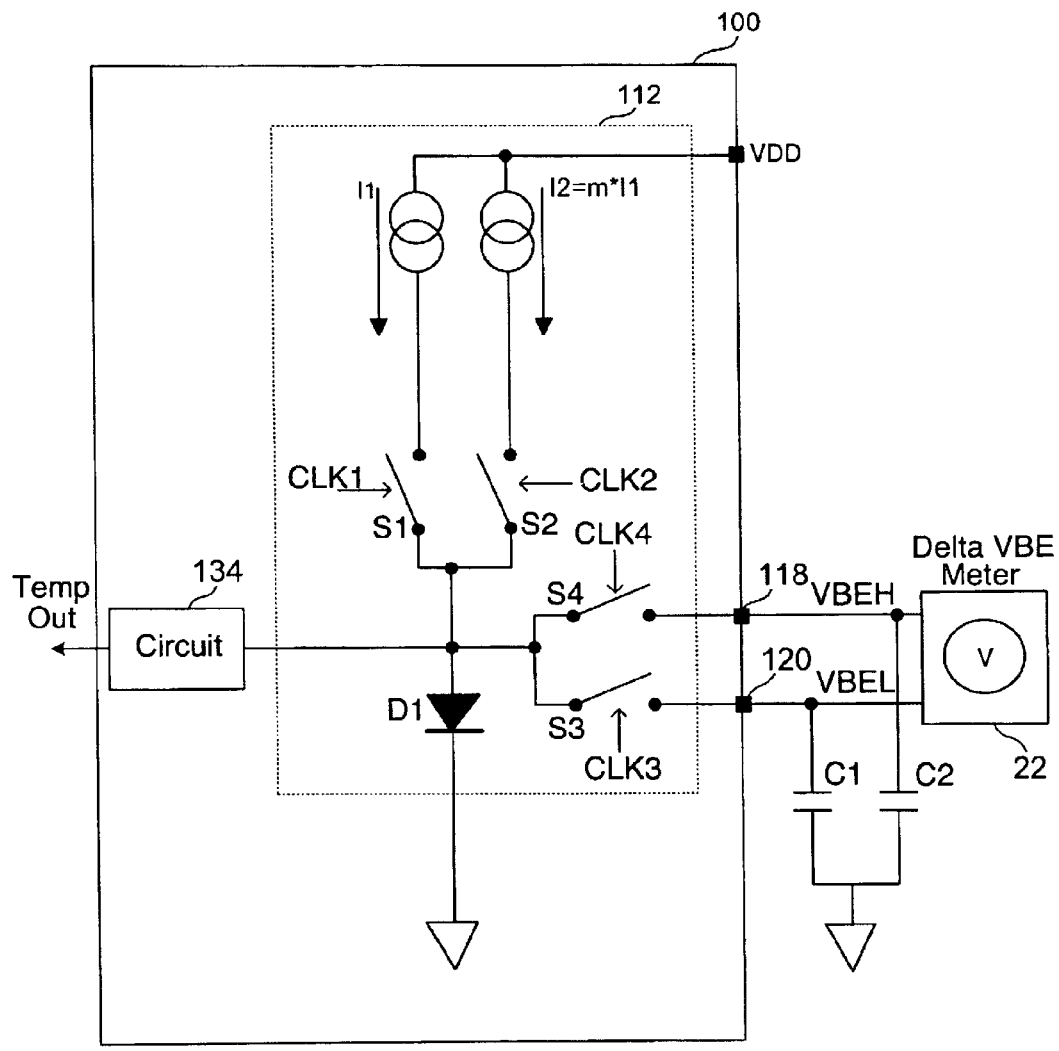
FIG. 4 is a schematic diagram of a temperature sensor including circuitry for practicing the temperature measurement method of the present invention.

While in the above description, the method of the present invention is applied to any integrated circuit for measuring the substrate temperature thereof, the temperature measurement method of the present invention has particular application in a temperature sensor for measuring the sensed temperature directly and using the sensed temperature to calibrate the temperature sensor. FIG. 4 is a schematic diagram of a temperature sensor including circuitry for practicing the temperature measurement method of the present invention.

Referring to FIG. 4, a temperature sensor 100 includes a temperature sensing circuit 112 for generating a voltage indicative of the temperature of the substrate. The voltage at node 14 representing the sensed temperature is coupled to temperature sensor circuitry denoted by a circuit block 134 in FIG. 4. Circuit block 134 may include circuits for performing analog-to-digital conversion, filtering and other signal processing functions. In typical temperature sensors, circuit block 134 may include amplifiers, comparators or integrators. Circuit block 134 operates to generate an output temperature signal (Temp Out) for temperature sensor 100. The construction of temperature sensor 100 shown in FIG. 4 is illustrative only and is intended to be a representative block diagram of any temperature sensor, currently known or to be developed. The temperature measurement of the present invention can work with any types of temperature sensors. The exact configuration of the temperature sensor is not critical to the practice of the present invention.

In the case where the integrated circuit of interest is a temperature sensor, a temperature sensing circuit is already included and thus only minimal circuitry need to be introduced to practice the method of the present invention. Referring to FIG. 4, temperature sensor 100 includes a single-diode switched current temperature sensing circuit 112 constructed in the same manner as temperature sensing circuit 12 of FIG. 1. Like elements in FIG. 1 and FIG. 4 are given like reference numerals and will not be further described. To implement the method of the present invention, only switches S3 and S4 are required to be added to the basic temperature sensing circuitry. Switches S3 and S4 couple the diode output node (node 14) to external leads 118 and 120 on temperature sensor 100. In the same manner as described above in reference to FIG. 1, external capacitors (capacitors C1 and C2) are coupled to external leads 118 and 120 for sampling and holding the diode voltages on the respective lead and an external voltmeter is coupled to the capacitors for measuring the voltage difference thereof.

According to one embodiment, the temperature measurement method of the present invention is implemented in a test mode of temperature sensor 100. In the test mode, the temperature of diode D1 (the sensed temperature) is measured using the external capacitors synchronously with temperature measurements (measured temperature) being performed by temperature sensor 100. Because the sensed temperature is measured at the same time as the measured temperature, the two temperatures should be the same except for errors introduced by circuitry in the temperature sensor. Thus, by determining the difference between the sensed temperature and the measured temperatures, temperature sensor 100 can be calibrated accordingly. Typically, calibration of a temperature sensor is performed near the end of the manufacturing process, such as after package assembly, where the temperature sensor is trimmed to improve the accuracy of the temperature measurements. Trimming can be performed, for example, to adjust a ratiometric gain of an analog-to-digital converter configured for measuring delta-VBE voltages in the temperature sensor.

An important feature of the method of the present invention is that temperature measurements are performed synchronously with measurements being performed by the temperature sensor. Thus, the substrate temperature as sensed by the temperature sensing diode D1 is measured simultaneously by the temperature sensor and the external capacitors/voltmeter. Thus, the method of the present invention can capture the actual substrate temperature measured by the diode which substrate temperature can be used to accurately calibrate the temperature sensor.

The operation of temperature measurement method in temperature sensor 100 is similar to the operation of the temperature measurement method in integrated circuit 10 described above. The timing diagram of FIG. 2 is also applicable in the present embodiment. Specifically, when the test mode is activated, temperature sensor 100 initiates a temperature conversion cycle for measuring the substrate temperature using diode D1. Each temperature conversion cycle may include multiple numbers of sampling cycles. For conventional one stage charge balancing based temperature sensors, the total number of sampling cycles is determined by the precision of the temperature output signal desired. For example, in a digital temperature sensor where a 10-bit temperature output is required, a total of 1024 sampling cycles are required in each conversion cycle. It is assumed that a temperature conversion cycle is completed in a short enough time that the substrate temperature does not vary appreciably during the conversion cycle.

During each sampling cycle, clock CLK1 and CLK2 are alternately engaged to excite diode D1 so that a change in diode voltage at node 14 results. The change in diode voltage V-diode is measured by temperature sensor 100 to generate the temperature output signal. Synchronously with the assertion of clock CLK1, clock CLK3 is also asserted so that the VBEL voltage value is sampled and held on capacitor C1. On the other hand, synchronously with the assertion of clock CLK2, clock CLK4 is asserted so that the VBEH voltage value is sampled and held on capacitor C2. Depending on the capacitance values of capacitors C1 and C2, the time constant required to charge the capacitors to the final VBEL and VBEH values may be several hundred sampling cycles. In all cases, the time constant to charge the capacitors can be made to be much shorter than the time for one conversion cycle of temperature sensor 100.

The use of the temperature measurement method of the present invention to calibrate a temperature sensor realizes many advantages.

First, because the same temperature sensing element is used by the temperature sensor and by the temperature measurement method of the present invention, very accurate temperature calibration can be performed which level of accuracy cannot be readily attained using conventional calibration methods. In conventional calibration methods where a separate temperature sensing element is used, area mismatch between the sensing elements and physical location differences of the two sensing elements may introduce inaccuracies which can be difficult to compensate. By obtaining the sensed temperature and the measured temperature using the same temperature sensing element, a very accurate calibration of the temperature sensor can be effectuated.

Second, the method of the present invention also has advantages over conventional calibration methods where measurements from the temperature sensor are compared to measurements from a reference device placed in close proximity to determine measurement accuracy. These types of calibration methods are not desirable as the physical separation of the temperature sensor and the reference device necessarily introduces errors in the temperature measurements. Accordingly to the present invention, the excitation current source, the temperature sensing element and the switches are all built on the same integrated circuit as the temperature sensor using the same fabrication process, thus more accurate measurements can be obtained for more precise calibration.

Third, the temperature measurement method of the present invention can be applied to calibrate the temperature sensor at the wafer level rather than at the package level. By measuring and trimming the temperature sensor at the wafer level, large manufacturing cost saving can be realized.

Fourth, the external leads used for carrying out the method of the present invention can be multiplexed with other pin functions so that no additional pin is required to practice the method of the present invention. Leads 118 and 120 can be used for other purpose in normal operation. When the temperature sensor is placed in the test mode, leads 118 and 120 can be configured for external temperature measurement by coupling lead 118 to switch S4 and coupling lead 120 to switch S3. When the temperature sensor is not in the test mode, leads 118 and 120 can resumed their normal pin functions.

Lastly, the temperature measurement method of the present invention also has advantage over conventional methods which measure the VBEL voltage separately from the VBEH voltage. Such method may introduce dynamic temperature error as the temperature may change slightly between the time VBEL is measured and VBEH is measured. In the present method, VBEH and VBEL are measured continuously throughout a conversion cycle so that dynamic temperature error is avoided.

Figure 5:
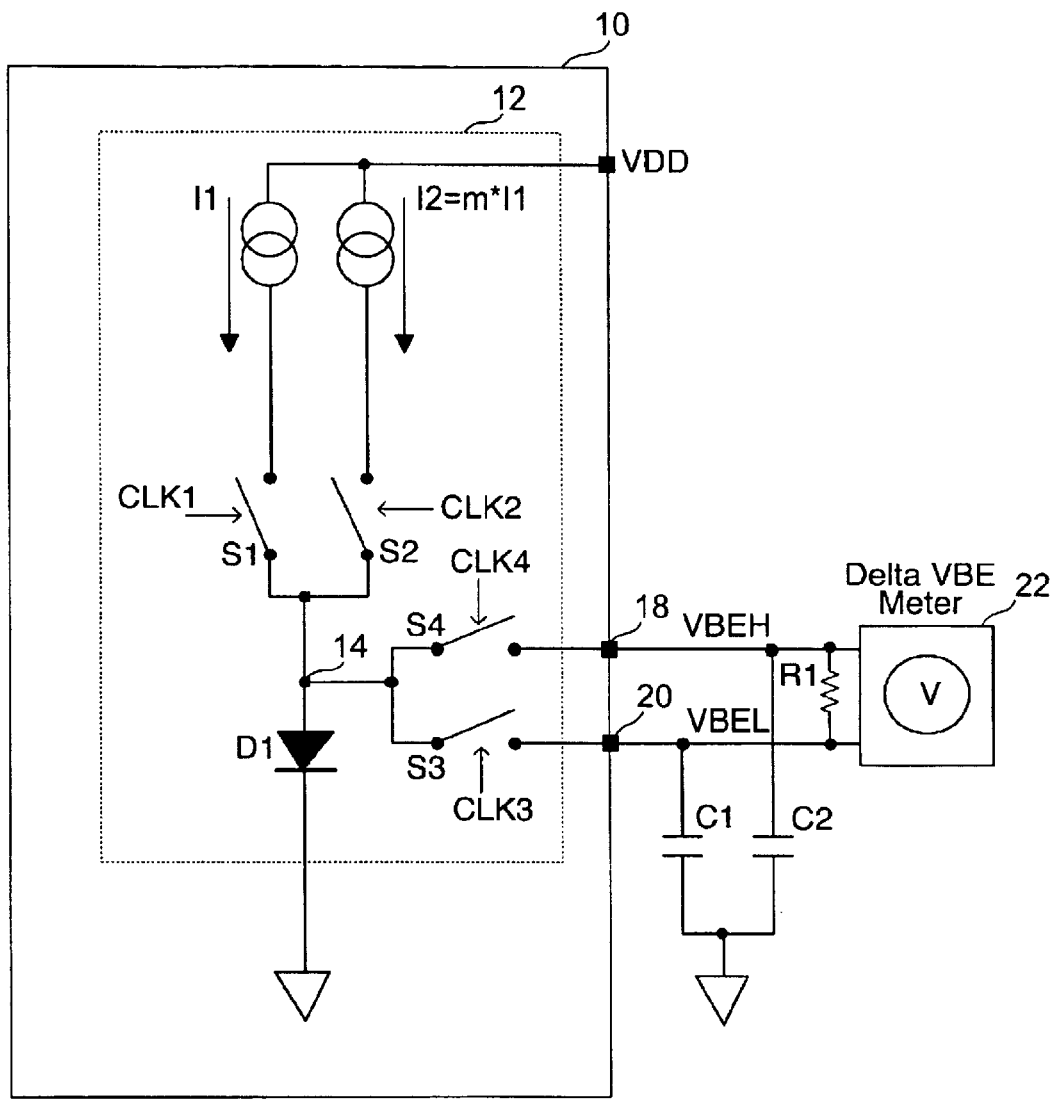
FIG. 5 is a circuit diagram of a temperature measurement circuit which can be used to practice the method of the present invention in an alternate embodiment.

According to an alternate embodiment of the present invention, a resistor having high resistance value is coupled across the VBEH voltage node and the VBEL voltage node for charge injection compensation. That is, the resistor is coupled across capacitor C1 and capacitor C2 of FIG. 1 or FIG. 4. FIG. 5 is a circuit diagram of a temperature measurement circuit which can be used to practice the method of the present invention in an alternate embodiment. Referring to FIG. 5, a resistor R1 is coupled between the two voltage input terminals of voltmeter 22. The addition of resistor R1 provides compensation for static error caused by charge injection at switches. Specifically, when switch S3 or S4 is turned off, charge injection occurs whereby extra charge is stored on the respective capacitor. The charge injection error represents an average DC current of $\partial Q/\partial t$. The average current can be canceled by supplying an opposing average current. In the present embodiment, the resistor across the two capacitors provides a path for the cancellation current. Charge sharing between the two VBE voltage nodes through the resistor will act to cancel out the charge injection error over time. In one embodiment, the resistor has a resistance value of 200 MΩ.

According to another alternate embodiment of the present invention, the sampling window, that is the "on" time of clocks CLK3 and CLK4, is adjusted to obtain the desired on-resistance value for switches S3 and S4. Specifically, the on-resistance of switches S3 and S4 decreases when the on time of the switches is made longer. Thus, by widening the sampling window, that is, by making the on time of the switches longer, the on-resistance of the switches is made smaller and the corresponding time constant for charging the capacitors can be made shorter. Of course, the sampling window should be opened only after voltage changes at the temperature sensing diode have settled after the switched current is applied.

The above detailed descriptions are provided to illustrate specific embodiments of the present invention and are not intended to be limiting. Numerous modifications and variations within the scope of the present invention are possible. The present invention is defined by the appended claims.

We claim:

1. A method for measuring a temperature of an integrated circuit, the integrated circuit including a temperature sensing element being excited by a first switched current and a second switched current, the method comprising:
   coupling a first capacitor to the temperature sensing element through a first switch, the first capacitor being external to the integrated circuit;
   coupling a second capacitor to the temperature sensing element through a second switch, the second capacitor being external to the integrated circuit;
   charging the first capacitor through the first switch to a first voltage when the temperature sensing element is being excited by the first switched current;
   charging the second capacitor through the second switch to a second voltage when the temperature sensing element is being excited by the second switched current; and
   measuring a difference between the first voltage and the second voltage to determine the temperature of the integrated circuit.

2. The method of claim 1, wherein the temperature sensing element is a diode-connected bipolar transistor.

3. The method of claim 1, wherein the first switched current and the second switched current have a ratioed value.

4. The method of claim 3, wherein the second switched current is m times the first switched current.

5. The method of claim 4, wherein the first capacitor has a smaller capacitance value than the second capacitor.

6. The method of claim 1, wherein the first switch and the second switch are formed as part of the integrated circuit.

7. The method of claim 1, further comprising:
   providing a resistive path between the first capacitor and the second capacitor.

8. The method of claim 1, wherein the temperature of the integrated circuit is determined by $T=(\Delta V_{BE}*q)/(nf*k*\ln(I2/I1))$, where $\Delta V_{BE}$ is the difference between the first voltage and the second voltage, q is the electronic charge, k is the Boltzmann's constant, nf is the emission coefficient, I1 is the current value of the first switched current and I2 is the current value of the second switched current.

9. The method of claim 1, further comprising:
   applying the first switched current to the temperature sensing element during a first clock period;
   enabling the first switch during the first clock period to charge the first capacitor;
   applying the second switched current to the temperature sensing element during a second clock period, the second clock period being not overlapped with the first clock period; and
   enabling the second switch during the second clock period to charge the second capacitor.

10. The method of claim 9, wherein the first clock period and the second clock period are repeatedly applied to repeatedly excite the temperature sensing element, and the first switch and the second switch are accordingly repeatedly enabled to charge the first capacitor and the second capacitor.

11. A method for calibrating a temperature sensor, the temperature sensor comprising a temperature sensing element excited by a first switched current and a second switched current and providing a temperature output signal, the method comprising:
   coupling a first capacitor to the temperature sensing element through a first switch, the first capacitor being external to the temperature sensor;
   coupling a second capacitor to the temperature sensing element through a second switch, the second capacitor being external to the temperature sensor;
   charging the first capacitor through the first switch to a first voltage when the temperature sensing element is being excited by the first switched current;
   charging the second capacitor through the second switch to a second voltage when the temperature sensing element is being excited by the second switched current;
   measuring a difference between the first voltage and the second voltage to determine a first temperature;
   measuring a second temperature using the temperature sensor; and
   calibrating the temperature sensor using the difference between the first temperature and the second temperature.

12. The method of claim 11, wherein the act of calibrating the temperature sensor comprises trimming a circuit in the temperature sensor.

13. The method of claim 11, wherein the act of calibrating the temperature sensor comprises trimming a ratiometric gain of an analog-to-digital converter configured for measuring delta-VBE voltages in the temperature sensor.

14. The method of claim 11, wherein the temperature sensing element is a diode-connected bipolar transistor.

15. The method of claim 11, wherein the first switched current and the second switched current have a ratioed value.

16. The method of claim 11, wherein the second switched current is m times the first switched current.

17. The method of claim 16, wherein the first capacitor has a smaller capacitance value than the second capacitor.

18. The method of claim 11, wherein the first switch and the second switch are formed as part of the temperature sensor.

19. The method of claim 11, further comprising:
   providing a resistive path between the first capacitor and the second capacitor.

20. The method of claim 11, wherein the first temperature is determined by $T=(\Delta V_{BE}*q)/(nf*k*\ln(I2/I1))$, where $\Delta V_{BE}$ is the difference between the first voltage and the second voltage, q is the electronic charge, k is the Boltzmann's constant, nf is the emission coefficient, I1 is the current value of the first switched current and I2 is the current value of the second switched current.

21. The method of claim 11, further comprising:
   applying the first switched current to the temperature sensing element during a first clock period;
   enabling the first switch during the first clock period to charge the first capacitor;
   applying the second switched current to the temperature sensing element during a second clock period, the second clock being not overlapped with the first clock period; and
   enabling the second switch during the second clock period to charge the second capacitor.

22. The method of claim 21, wherein the first clock period and the second clock period are repeatedly applied to repeatedly excite the temperature sensing element, and the first switch and the second switch are accordingly repeatedly enabled to charge the first capacitor and the second capacitor.

23. A temperature measurement circuit for a temperature sensor, comprising:
   a temperature sensing circuit comprising:
      a first current source providing a first current;
      a second current source providing a second current;
      a temperature sensing element;
      a first switch coupling the first current source to the temperature sensing element;
      a second switch coupling the second current source to the temperature sensing element;
   wherein the first switch and the second switch are alternately asserted to alternately apply the first current and the second current to the temperature sensing element;
   sensor circuitry for receiving a voltage at the temperature sensing element and generating an temperature output signal;
   a third switch coupling the voltage at the temperature sensing element to a first external lead;
   a fourth switch coupling the voltage at the temperature sensing element to a second external lead;
   a first capacitor, external to the temperature sensor, coupled to the first external lead;
   a second capacitor external to the temperature sensor and coupled to the second external lead; and
   a voltage measurement device external to the temperature sensor and coupled between the first capacitor and the second capacitor;
   wherein the first capacitor is charged through the first switch to a first voltage when the temperature sensing element is being excited by the first current, and the second capacitor is charged through the second switch to a second voltage when the temperature sensing element is being excited by the second switched current, such that a difference between the first voltage and the second voltage is used to determine a first temperature.

24. The temperature measurement circuit of claim 23, wherein the first temperature is compared with a second temperature generated by the temperature sensor as the temperature output signal and the difference between the first temperature and the second temperature is used to calibrate the temperature sensor.

25. The temperature measurement circuit of claim 23, wherein the second current is m times the first current.

26. The method of claim 25, wherein the first capacitor has a smaller capacitance value than the second capacitor.

* * * * *